E. W. ALBERS.
ENGINE VALVE OPERATING MECHANISM.
APPLICATION FILED MAR. 18, 1915.
1,168,841.
Patented Jan. 18, 1916.
3 SHEETS—SHEET 1.
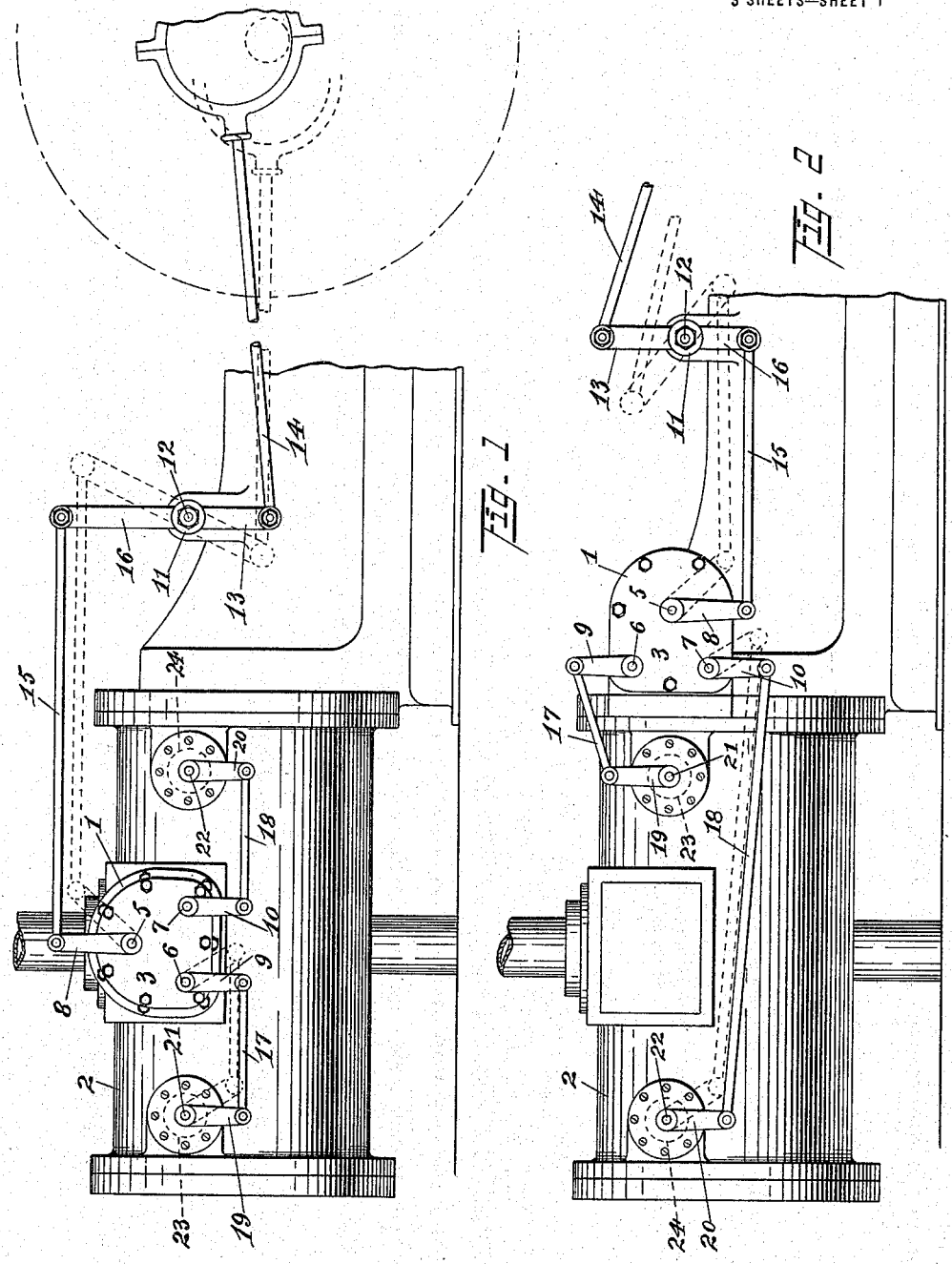
Witnesses:
Inventor
Edwin W. Albers E. W. ALBERS.
ENGINE VALVE OPERATING MECHANISM.
APPLICATION FILED MAR. 18, 1915.
1,168,841.
Patented Jan. 18, 1916.
3 SHEETS—SHEET 2.
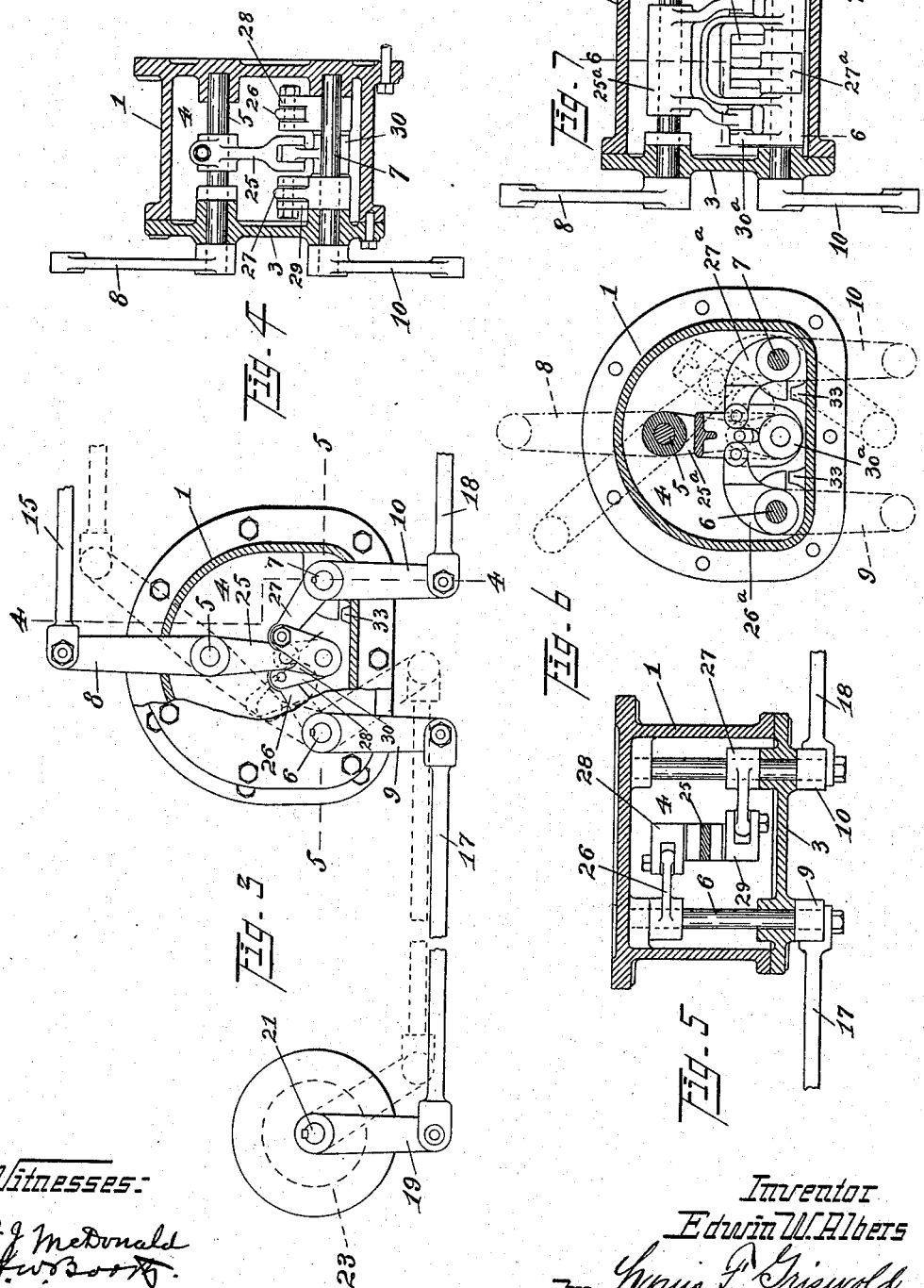

E. W. ALBERS.
ENGINE VALVE OPERATING MECHANISM.
APPLICATION FILED MAR. 18, 1915.
1,168,841.
Patented Jan. 18, 1916.
3 SHEETS—SHEET 3.
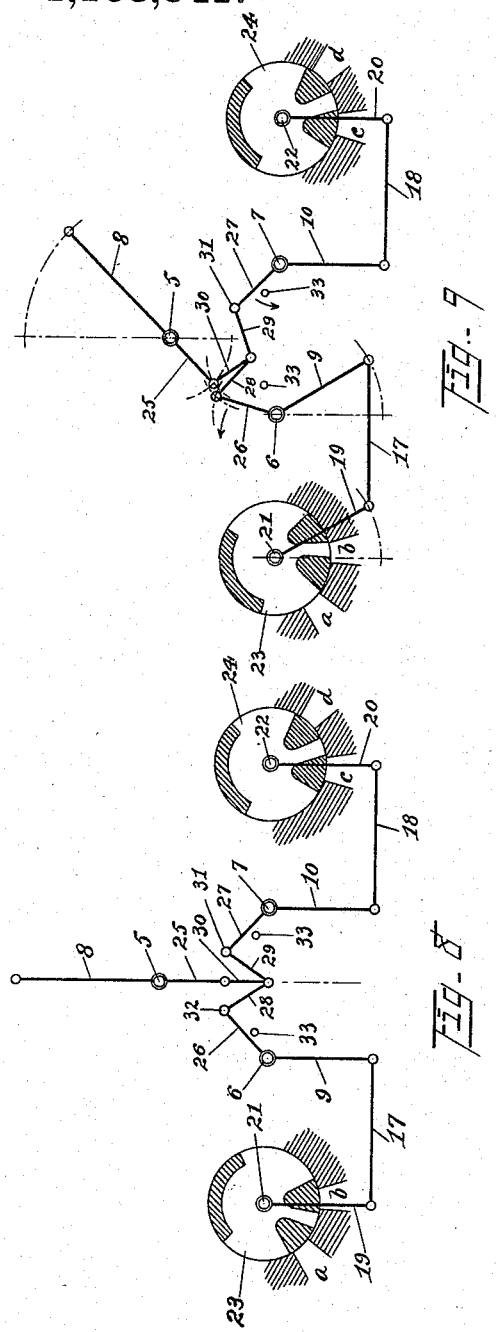
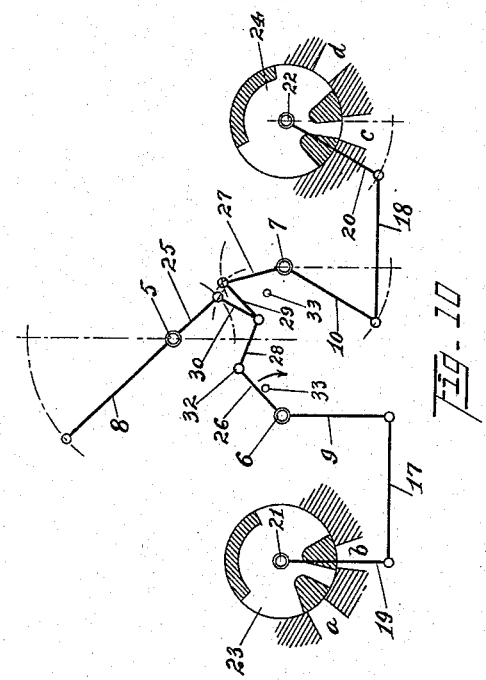
Witnesses:
J. J. McDonald
Inventor.
Edwin W. Albers
by Wm. P. Griswold.
Attorney

UNITED STATES PATENT OFFICE.

EDWIN W. ALBERS, OF DOVER, OHIO.

ENGINE-VALVE-OPERATING MECHANISM.

1,168,841.   Specification of Letters Patent.   Patented Jan. 18, 1916.

Application filed March 18, 1915.   Serial No. 15,279.

*To all whom it may concern:*

Be it known that I, EDWIN W. ALBERS, a citizen of the United States, residing at Dover, in the county of Cuyahoga and State of Ohio, have invented certain new and useful Improvements in Engine-Valve-Operating Mechanism, of which the following is a specification.

This invention relates to mechanism for automatically opening and closing, or controlling the intake valves of steam engines, and it has for its objects the provision of simple and durable means for accomplishing the required result in a positive manner.

It provides a construction that is economical in installation and in upkeep, that admits of easy and accurate adjustment, and that is equally efficient when applied to either high or low speed engines.

A further object of the invention is the provision of valve operating mechanism in which the principal elements for actuating both intake valves are confined in a single oil tight housing that is adaptable to application to any position on the cylinder, either top, side, or end, thereby providing the advantage of readily and economically accommodating the mechanism to any desired location of valves.

The present invention provides the arrangement and combination of a system of co-acting levers and connecting links actuated by a rod eccentrically connected with the crank shaft, whereby a quick movement is imparted to one of the intake valves at the proper time to open same, while the opposite intake valve is held absolutely at rest in a closed position, and on the reciprocating movement of the piston the operation of the two valves is reversed.

In the Corliss and other types of engine construction heretofore the valves have been operated by eccentric rods from the crankshaft, which is beyond doubt the most logical way of timing the valves relative to the action of the piston, but as far as I have been able to ascertain, up to the present time the various mechanisms for producing the required results have been complicated in construction and operation, comprising a multiplicity of co-acting elements, necessitating difficult adjustment and possessing numerous other disadvantages when considered from the stand points of economy and efficiency.

It will readily be understood from the following description, reference being had to the accompanying drawings, that the present invention has overcome the objectionable features heretofore encountered in engine valve operating mechanism.

In the accompanying drawings forming a part of this specification, Figure 1 is a side elevation of a portion of a horizontal steam engine showing the improved mechanism positioned on one side of the cylinder. Fig. 2 is a similar view illustrating said mechanism on the end of the cylinder. Fig. 3 is an elevation of the improved mechanism with certain connections broken and the housing partially in section. Fig. 4 is a section taken substantially on line 4—4 Fig. 3, but showing the levers, links and shafts in full. Fig. 5 is a section on line 5—5 Fig. 3. Fig. 6 illustrates a modification of the design of levers, and is a section on line 6—6 Fig. 7. Fig. 7 is a vertical section through the housing of the modification. Figs. 8, 9 and 10 are diagrammatic illustrations of the movements of the various elements.

To facilitate the explanation of the invention, similar characters of reference are employed to designate similar parts in the drawings and description.

In Figs. 1 and 2, two different positions, relative to the intake valves, of the casing housing the improved operating mechanism are shown. By comparison of these two illustrations it will readily be seen that the invention is applicable to various positions relative to the valves, the principles of operation remaining identical, but modifications in the position and construction of the external levers and connecting links being necessary to suit the conditions, therefore to avoid encumbering the specification, the description will be confined to the simple but practical embodiment of the invention as illustrated, assuming that the eccentric is properly timed to co-act with the piston and other elements in the performance of their functions.

Referring now to the drawings 1 is a casing, preferably made in one casting and adapted to be conveniently attached to the cylinder 2, and provided with a cap 3, to be bolted or otherwise fixed thereon, and form an oil-tight chamber 4. Journaled in the cap 3 and casing 1 are shafts 5, 6 and 7. Keyed or otherwise rigidly attached to the shafts 5, 6 and 7 respectively are crank members 8, 9 and 10. A lever 11 is fulcrumed at any convenient point on the engine frame, as at 12 Figs. 1 and 2. The member 13 of the lever 11 is connected with the eccentric rod 14, while a link 15 connects the member 16 with the crank 8. Links 17 and 18 connect the cranks 9 and 10, respectively with cranks 19 and 20 which are rigidly attached to the stems 21 and 22 of the respective intake valves 23 and 24. The difference in the location of the mechanism relative to the movement of the piston as shown in Fig. 2 necessitates a difference in the timing of the functions, and to avoid confusion in the identification of the different parts in the drawings, the positions of the valves 23 and 24 and their connecting parts are reversed in Fig. 2.

Referring now particularly to Figs. 3, 4 and 5, the mechanism confined within the chamber 4, and its co-action with the external elements will be described. The shaft 5 has a crank member 25 fixed thereto, and the shafts 6 and 7 have cranks 26 and 27 fixed thereon. The crank 25 is movably connected with the cranks 26 and 27 by a toggle made up of links 28 and 29 connected, respectively with the cranks 26 and 27, both of said links being connected with a link 30 which is in turn connected with the crank 25.

The operation of the improved mechanism can be best understood by reference to the diagrams, in which Fig. 8 shows the relative position of the co-acting parts in their neutral position, or with both intake valves closed, assuming that $a$, $b$, $c$ and $d$ are the live steam ports in the cylinder. When the crank 8 is moved to the position shown in Fig. 9, through the co-action of the eccentric, the lever 11, and the link 15, there is a positive thrust on the crank 26 in the direction of arrow, this carries the crank 9 to the position shown and opens the valve 23 through the medium of the link 17 and crank 19, the several members oscillating on their movable connections and on the fixed pivotal points 5, 6, and 21. There is necessarily a considerable amount of resistance to overcome, due to friction and the steam pressure on the valves, this resistance makes the connection 31 a fixed point of oscillation for the link 29 during the above described action, and retains the valve 24 in the closed position. When the crank 8 has traveled its predetermined arc, governed of course by the eccentric, it is returned to the neutral position, gradually closing the valve 23, and as it continues its movement to the position shown in Fig. 10 the valve 24 is opened, the point 32 becoming a fixed pivotal center for the link 28 and retaining the valve 23 in closed position.

While in practice it is a demonstrable fact that the resistance will cause the several elements to perform the functions above described, yet theoretically the link 27 Fig. 9, or the link 26 Fig. 10, would have a tendency to a slight movement in direction of arrows shown. As an emergency provision to counteract the possible downward movement of the links 26 and 27, stop members 33 are embodied in the construction.

It will readily be seen that the matter of lubrication is a valuable feature of the present invention, as the chamber 4 can be loaded with oil in which the working parts are entirely submerged. The casing being oil-tight provides against waste of lubricant.

Another novel and economical factor of the invention is the facility with which inspection, adjustment or repairs of the working parts is accomplished. This is done by simply removing the external cranks 8, 9 and 10 and then taking off the cap 3, which can be done without dismantling the engine, or the links 15, 17 and 18 can be quickly disconnected from the cranks 8, 9 and 10 and the housing containing the valve operating mechanism, intact, disconnected from the engine. The last mentioned feature is extremely desirable and economical in the manufacture of a number of engines of the same size and design. The working parts can be assembled in their individual casings, the bolt holes in the flanges of said casings and their corresponding holes in the cylinder can be bored and tapped to template, the casings are then attached to the cylinders and the external connections made with duplicate parts, thus eliminating to a great extent special adjustment to each individual engine. The cranks 26 and 27 are interchangeable, as also are the links 28 and 29, thereby providing economy in the item of patterns, and facilitating the assembling and repairing.

The mechanism as illustrated in Figs. 3, 4 and 5 is a practical embodiment of the improvement, but the invention admits of various modifications in details of construction without departure from the general principles thereof, as for example, in Figs. 6 and 7, the member $25^a$ while of different design, performs the same function, in like manner as the member 25, the link member $30^a$, and the cranks $26^a$ and $27^a$ are the respective equivalents of the members 30, 26 and 27 and perform the same functions but are of different design and location. Thus it will be understood that I am not confined to the construction as shown only so far as limited by the existing state of the art and the scope of the annexed claims.

What I claim and desire to secure by Letters Patent is—

1. Valve operating mechanism for engines comprising a lever, means for actuating said lever in timed relation to the piston movement, two cranks on a shaft mounted in suitable bearings, connecting means from one of said cranks to the lever, a link connected with the other of said two cranks, rocker arms on shafts mounted in bearings parallel to the first named shaft, links connecting said rocker arms with the first named link, secondary cranks attached to the last named shafts, and connecting means from the last named cranks to cranks on the valves.

2. In valve operating mechanism for engines the combination of a lever; means for actuating said lever in timed relation to the piston movement; a housing adapted to be attached to the engine; a series of three parallel crank shafts mounted in said housing; cranks on each of said shafts; a three link toggle connection between said cranks; a second crank on one of said shafts; connecting means from said second crank to the lever; secondary cranks on each of the other shafts; and connecting means from the last named cranks to cranks attached to the valves.

3. In valve operating mechanism for engines the combination of the valves; a casing; a series of levers mounted in said casing; a three link toggle connection between said levers; levers on the valves; connecting means from the valve levers to levers mounted in the casing; a lever mounted between the casing and crank-shaft of the engine; means for actuating the last named lever in timed relation to the piston movement; and connecting means from the last named lever to a lever mounted in the casing, whereby the valves are alternately opened and closed in timed relation to the operation of the piston.

4. In valve operating mechanism for engines the combination of the piston; the crank-shaft; an eccentric rod actuated by an eccentric on said crank-shaft; a lever to which said eccentric rod is connected; a casing adapted to be attached to the engine; a series of levers mounted in said casing; a three link toggle connection between said levers; connecting means from one of the levers mounted in the casing to the eccentric-rod lever; valves connected with the cylinder; levers on said valves; and connecting means from the valve levers to levers mounted in the casing, whereby the valves are alternately opened and closed in timed relation to the operation of the piston.

5. In valve operating mechanism for engines the combination of a lever; means for actuating said lever in timed relation to the piston movement; a casing adapted to be attached to the engine; a series of shafts mounted in said casing; levers on each of said shafts within the casing; links connected with each of said levers and having a universal connection with each other; stop members for limiting the throw of the levers; levers on said shafts outside the casing; connecting means from the first named lever to one of the external casing levers; the cylinder valves; levers attached to said valves; and connecting means from said levers to external casing levers.

EDWIN W. ALBERS.

Witnesses:
O. C. BILLMAN,
L. F. GRISWOLD.

Copies of this patent may be obtained for five cents each, by addressing the "Commissioner of Patents, Washington, D. C."